(12) United States Patent
Daikoku

(10) Patent No.: US 7,099,090 B2
(45) Date of Patent: Aug. 29, 2006

(54) OPTICAL PICKUP LENS COMPRISING A LENS AND A LENS HOLDER WHICH HAVE MARKS TO EASILY MOUNT THE LENS ON THE LENS HOLDER AT A PREDETERMINED ANGLE IN THE DIRECTION OF ROTATION OF THE LENS, AND OPTICAL PICKUP UNIT COMPRISING THE OPTICAL PICKUP LENS

(75) Inventor: Akihiro Daikoku, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/782,920

(22) Filed: Feb. 23, 2004

(65) Prior Publication Data

US 2004/0165288 A1    Aug. 26, 2004

(30) Foreign Application Priority Data

Feb. 21, 2003   (JP)  .............................. 2003-043994

(51) Int. Cl.
  *G02B 13/18*  (2006.01)
  *G02B 3/02*   (2006.01)
  *G02B 7/02*   (2006.01)

(52) U.S. Cl. ....................................... 359/719; 359/819

(58) Field of Classification Search ................ 359/719, 359/811–813, 819, 822–823, 827, 830; 264/1.1, 264/1.32
See application file for complete search history.

(56) References Cited

U.S. PATENT DOCUMENTS

| 5,754,350 | A  | * | 5/1998  | Sato ............................ 359/819 |
| 6,089,761 | A  | * | 7/2000  | Sakurai ....................... 359/828 |
| 6,144,500 | A  |   | 11/2000 | Iwaki et al. |
| 6,215,604 | B1 | * | 4/2001  | Hori ............................ 359/819 |
| 6,219,191 | B1 |   | 4/2001  | Iwaki et al. |
| 6,441,975 | B1 | * | 8/2002  | Ebert et al. .................. 359/819 |
| 6,643,076 | B1 | * | 11/2003 | Montagu .................... 359/819 |

FOREIGN PATENT DOCUMENTS

| JP | 7-272302   | 10/1995 |
| JP | 10-246801  | 9/1998  |
| JP | 11-23807   | 1/1999  |
| JP | 2001-126275 | 5/2001  |

* cited by examiner

*Primary Examiner*—Alicia M Harrington
(74) *Attorney, Agent, or Firm*—Morrison & Foerster LLP

(57) ABSTRACT

An optical pickup lens having a lens and a lens holder, each of which has at least one mark in a direction of rotation based on an optical axis of the lens as a center of rotation. The mark(s) of the lens holder is provided so as to oppose the mark(s) of the lens. Preferably, the marks of the lens and the marks of the lens holder are provided at regular intervals. Since both the lens and the lens holder have the marks thereon, the lens can be mounted on the lens holder at a predetermined angle in the direction of rotation of the lens based on the center of rotation of the lens.

33 Claims, 7 Drawing Sheets

PRIOR ART

PRIOR ART

OPTICAL PICKUP LENS COMPRISING A LENS AND A LENS HOLDER WHICH HAVE MARKS TO EASILY MOUNT THE LENS ON THE LENS HOLDER AT A PREDETERMINED ANGLE IN THE DIRECTION OF ROTATION OF THE LENS, AND OPTICAL PICKUP UNIT COMPRISING THE OPTICAL PICKUP LENS

CROSS REFERENCE TO RELATED PATENT APPLICATION

The present application claims priority under 35 U.S.C. §119(a) on Patent Application No. 2003-043994 filed in Japan on Feb. 21, 2003, the entire contents of which are hereby incorporated by reference.

FIELD OF THE INVENTION

The present invention relates to an optical pickup lens to be used in an optical pickup unit mounted on an optical disc apparatus for recording data on an optical disc or the like or reproducing the recorded data therefrom.

BACKGROUND OF THE INVENTION

Optical pickup units are mounted on optical disc apparatuses (including magneto-optical disc apparatuses) such as compact discs (or CD), mini discs (or MD) and digital versatile discs (or DVD) apparatuses, etc. so as to record data on optical discs or reproduce the recorded data therefrom.

FIG. 13 shows a schematic diagram illustrating a structure of a conventional optical pickup unit (90), in which an optical pickup lens (10) comprising a lens (or an objective lens) (20) and a lens holder (30), a reflecting mirror (60), a collimator lens (70), and an optical unit (80) are arranged in this order from the side close to an optical disc (50). The optical unit (80) comprises a semiconductor laser as a light source (not shown) for emitting a laser beam, and photo detectors (not shown) which receive reflected light from the optical disc. A laser beam from the semiconductor laser of the optical unit (80) passes through the collimator lens (70), the reflecting mirror (60) and the lens (20) so as to irradiate the optical disc (50). The laser beam reflects on the optical disc (50), and then the reflected laser beam goes backward to be detected by the photo detectors of the optical unit (80).

The lens (20) is mounted on the lens holder (30) which is connected to and is driven by an optical pickup lens-driving mechanism (an actuator, not shown). The optical pickup lens (10) is composed of the lens (20) and the lens holder (30). This arrangement makes it possible to change position of the lens (20) relative to the optical disc (50) by operating the actuator. In other words, it is possible to drive the lens (20) independently in a direction parallel to an optical axis (40) of the lens and in a radial direction of the optical disc (50) (i.e., a direction perpendicular to an optical axis (40) of the lens). Therefore, focusing and tracking can be controlled.

Generally, a plastic lens formed by injection molding is used for the optical pickup lens. The plastic lens is formed by injecting molten plastic into a cavity of a mold through a gate of the mold, cooling and solidifying the same. Therefore, optical distortion (astigmatism) tends to grow in the plastic lens because of an influence of the resin flow generated on the lens being shaped in the mold. Moreover, in case where the mold has a plurality of cavities, subtle difference in the flow of the resin into the cavities of the mold varies the astigmatism of a plurality of the resultant lenses which are shaped in the respective cavities. Furthermore, even if a plurality of plastic lenses are shaped in the same cavity, the astigmatism of the resultant lenses may vary depending on variation in molding conditions for each of lots.

The presence of astigmatism of the optical pickup lens gives an influence on a focus error signal from the optical pickup unit, which may lead to unstable focus servo control. Therefore, careful attention is needed for mounting the lens on the lens holder so that the astigmatism of the lens and the astigmatism of the optical systems except for the lens can be canceled by each other as much as possible, to thereby minimize astigmatism of the whole of the optical pickup unit. In case of mass-production of optical pickup lenses each comprising a lens and a lens holder, an angle for mounting the lens on the lens holder (i.e., an angle for rotating the lens based on an optical axis of the lens as the center of rotation) at which influence of the astigmatism of the lens can be minimized is examined relative to each lot of molded lenses and to each of the cavities of molds, and then, the lens is mounted on the lens holder at the predetermined angle.

Conventionally, adjustment of the angle for mounting the lens (20) on the lens holder (30) is carried out as illustrated in FIGS. 14 to 16. FIG. 14 is a plan view of the optical pickup lens (10), schematically illustrating a method of mounting and positioning the lens (20) on the lens holder (30). FIG. 15 is a sectional view of the optical pickup lens shown in FIG. 14, and FIG. 16 is an exploded perspective view of the optical pickup lens shown in FIG. 14. Positioning of the lens (20) relative to the lens holder (30) in a direction parallel to the optical axis (40) of the lens (20) is carried out by placing a flat portion (22) of a round edge (21) of the lens (20) on a portion (32) of the lens holder (30) which receives the flat portion (22) of the round edge (21) of the lens (20). Further, the positioning of the lens (20) relative to the lens holder (30) in a direction perpendicular to the optical axis (40) of the lens (20) is performed by contacting an outer peripheral side portion (23) of the round edge (21) of the lens (20) with a portion (33) of the lens holder (30) which receives the outer peripheral side portion (23). Accordingly, the positioning of the lens (20) relative to the lens holder (30) can be easily achieved in the directions parallel and perpendicular to the optical axis (40) of the lens (20), respectively.

However, the conventional optical pickup lens (10) has a problem in that any means has not been taken to determine a position for rotating the lens (20) in the direction of rotation (45) of the lens relative to (based on or considering) the center of rotation of the lens (20) (i.e., the optical axis (40)). Therefore, the operation of mounting the lens (20) on the lens holder (30) at the predetermined angle is not easy (cf., JP-A-2001-126275). Further, the conventional optical pickup lens (10) has a problem in that it takes long in mounting the lens (20) on the lens holder (30) at the predetermined angle (cf., JP-A-2001-126275).

SUMMARY OF THE INVENTION

The present invention is developed in order to solve the foregoing problems, and an object of the present invention is to provide an optical pickup lens which comprises a lens and a lens holder and which makes it possible to correctly mount the lens on the lens holder at a predetermined angle with ease and in shorter time in a direction of rotation of the lens relative to a center of the rotation of the lens, compared with the conventional optical pickup lenses. Another object of the present invention is to provide an optical pickup unit comprising such optical pickup lens, and an optical disc apparatus comprising such optical pickup unit.

As a result of the present inventor's intensive researches for solving the foregoing problems, it is discovered that, by providing distinct marks on a lens and a lens holder in a direction of rotation based on (relative to or considering) an optical axis of the lens as a center of rotation, the lens can be correctly mounted on the lens holder at a predetermined angle with ease and in shorter time, as compared with the conventional optical pickup lenses. The present invention is accomplished based on the above discovery.

In an aspect according to the present invention, there is provided a novel optical pickup lens comprising a lens and a lens holder each of which has at least one mark in a direction of rotation based on an optical axis of the lens as a center of rotation.

In an embodiment of the optical pickup lens according to the present invention, the mark of the lens holder is provided so as to oppose (or face to) the mark of the lens.

In another embodiment of the optical pickup lens according to the present invention, the marks of the lens and the marks of the lens holder are provided at regular intervals, respectively.

In other embodiment of the optical pickup lens according to the present invention, one mark is provided on a position of a periphery of the lens, and at least eight marks are provided on such positions of the lens holder that are adjacent to the periphery of the lens.

In a further embodiment of the optical pickup lens according to the present invention, one mark is provided on such a position of the lens holder that is adjacent to the periphery of the lens, and at least eight marks are provided on positions of the periphery of the lens.

In a further embodiment of the optical pickup lens according to the present invention, at least one of the marks of the lens is discriminated from the other marks thereof.

In a further embodiment of the optical pickup lens according to the present invention, the lens has a round edge on which the mark of the lens is provided.

In a further embodiment of the optical pickup lens according to the present invention, the mark of the lens is in a form of a line, a convex portion, or a concave portion.

In a further embodiment of the optical pickup lens according to the present invention, the convex portion is provided as the mark of the lens, and a fitting portion which fits with the convex portion of the lens is provided on the lens holder.

In a further embodiment of the optical pickup lens according to the present invention, a plurality of fitting portions each of which fits with the, convex portion of the lens are provided on the lens holder by providing, on the lens holder, a plurality of ribs each of which opposes the convex portion of the lens and protrudes in a direction parallel to the optical axis of the lens.

In a further embodiment of the optical pickup lens according to the present invention, a plurality of fitting portions each of which fits with the convex portion of the lens are provided on a portion of the lens holder which receives an outer peripheral side portion of the lens by forming a plurality of grooves each of which opposes the convex portion of the lens and extends in a direction parallel to the optical axis of the lens.

In a further embodiment of the optical pickup lens according to the present invention, the lens is a plastic lens, and the mark of the lens is formed integrally with the lens while the lens is being shaped in a mold.

In another aspect of the present invention, there is provided an optical pickup unit comprising the optical pickup lens of the present invention.

In a further aspect of the present invention, there is provided an optical disc apparatus comprising the optical pickup unit of the present invention.

Since the optical pickup lens of the present invention comprises the lens and the lens holder each of which has at least one mark in the direction of rotation based on the optical axis of the lens as the center of rotation, an operation of mounting the lens on the lens holder at a predetermined angle in the direction of rotation based on the optical axis of the lens as the center of rotation can be facilitated.

Preferably, one convex portion is provided on a position of the periphery of the lens, and the plurality of fitting portions each of which fits with the convex portion of the lens are provided at regular intervals and at positions on the lens holder each of which can oppose the convex portion of the lens. Therefore, the positioning of the lens in the direction of rotation based on the optical axis of the lens as the center of rotation can be easily carried out in accordance with the predetermined angular scale.

BRIEF DESCRIPTION OF THE DRAWINGS

The present invention will be fully understood by the description with reference to the accompanying drawings.

DESCRIPTION OF REFERENCE NUMERALS

Figure 1:
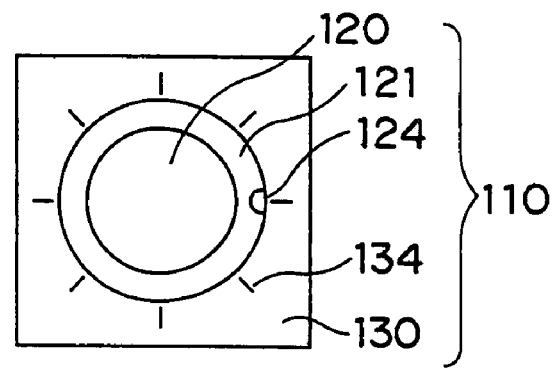
FIG. 1 is a front view of an optical pickup lens according to Embodiment 1 of the present invention.

10=an optical pickup lens, 20=a lens, 21=a round edge of the lens, 22=a flat portion of the round edge of the lens, 23=an outer peripheral side portion of the round edge of the lens, 30=a lens holder, 32=a portion of the lens holder which receives the flat portion of the round edge of the lens, 33=a portion of the lens holder which receives the outer peripheral side portion of the round edge of the lens, 40=an optical axis, 45=a direction of rotation of the lens, 50=an optical disc, 60=a reflecting mirror, 70=a collimator lens, 80=an optical unit, 90=an optical pickup unit, 110=an optical pickup lens, 120=a lens, 121=a round edge of the lens, 122=a flat portion of the round edge of the lens, 123=an outer peripheral side portion of the round edge of the lens, 124=a groove (or a concave portion), 125=a groove, 126=a groove, 127=a convex portion, 128=a convex portion, 130=a lens holder, 132=a portion of the lens holder which receives the flat portion of the round edge of the lens, 133=a portion of the lens holder which receives the outer peripheral side portion of the round edge of the lens, 134=a line, 135=a line, 136=a groove-like fitting portion, 137=a rib, and 138=a groove-like fitting portion.

DETAILED DESCRIPTION OF THE PREFERRED EMBODIMENTS

An "optical pickup lens" according to the present invention comprises a lens and a lens holder, each of which has at least one mark in a direction of rotation of the lens based on an optical axis of the lens as a center of rotation. Accordingly, the "lens", the "lens holder" and the "optical pickup lens" comprising them may be conventional ones, except that each of the "lens" and the "lens holder" has at least one mark in the direction of rotation of the lens based on the optical axis of the lens as the center of rotation. In other words, there is no limitation on them as long as the optical pickup lens intended in the present invention can be obtained.

In general, the lens holder has an internal space with a stepped cylindrical shape which is formed by stacking two cylinders with different diameters each other, and the lens is fitted in the cylindrical space with a larger diameter of the lens holder. The lens fitted in the lens holder is rotatable based on the optical axis of the lens as the center of rotation within the lens holder. An outer circumference of the lens is generally in a shape of a circle. Therefore, the optical pickup lens comprises such a lens and such a lens holder, and at least one mark is provided on the outer circumference of the lens, and at least one mark is provided at a portion of the lens holder that is adjacent to the outer circumference of the lens.

The mark of the lens holder is preferably provided so as to oppose the mark of the lens: the mark of the lens holder is preferably provided so as to be able to oppose (or face to) the mark of the lens by rotating the lens on the optical axis of the lens within the lens holder, since a position of the lens in the direction of rotation of the lens, relative to the optical axis of the lens, can be more correctly and more easily confirmed.

There is no limitation on number of the marks of each of the lens and the lens holder as long as at least one mark is provided on a position of the periphery of the lens and on a position of the lens holder which is adjacent to the periphery of the lens in the direction of rotation of the lens based on the optical axis of the lens. Moreover, there is no limitation on intervals between each of the marks provided on each of the lens and the lens holder. However, preferably, the marks are provided at regular intervals, in other words, at regular angular intervals, relative to the optical axis of the lens as the center of rotation, because the lens can be correctly mounted on the lens holder in accordance with a predetermined scale in the direction of rotation of the lens.

In the optical pickup lens according to the present invention, it is preferable to mount the lens on the lens holder in accordance with a smaller angular scale in the direction of rotation of the lens, in order to fully reduce astigmatism of a whole of an optical pickup unit. The angular intervals of the marks provided on the lens and/or the lens holder are preferably not more than 45°. The angular intervals of the marks provided on the lens and/or the lens holder may be 45°.

Since the lens can be mounted on the lens holder at the angular intervals of not more than 45°, it is preferable to provide one mark at a position of the periphery of the lens, and to provide at least eight marks at regular intervals on a portion of the lens holder which is adjacent to the periphery of the lens.

It is also preferable to provide one mark at a position of the lens holder which is adjacent to the periphery of the lens, and to provide at least eight marks at regular intervals on the periphery of the lens.

There is no particular limitation on a shape, size, pattern and color of the "mark" of either of the lens and the lens holder according to the present invention, as long as the mark can be a target (or a sign) for indicating the direction of rotation and the angle of rotation of the lens, and is useful to provide the optical pickup lens according to the present invention.

Examples of the mark to be provided on the lens include a line, a convex portion (which contains a projection etc.), a concave portion (which contains a dent and a groove etc.), and a fitting portion (which contains a fitting portion to fit with the convex portion and a fitting portion to fit with the concave portion).

Examples of the mark to be provided on the lens holder include a line, a convex portion (which contains a projection etc.), a concave portion (which contains a dent and a groove etc.), and a fitting portion (which contains a fitting portion to fit with the convex portion and a fitting portion to fit with the concave portion).

Preferably, at least one of the marks of the lens can be discriminated from the other marks of the lens, because it is easy to specify the direction of rotation of the lens and the angle of rotation of the lens. There is no particular limitation on a method for discriminating the mark from the other marks, as long as the mark can be discriminated from the others. The mark may be discriminated by any method such as a change in a shape, size, pattern, color or the like.

In the optical pickup lens of the present invention, it is preferable that the lens has a round edge because the round edge makes it easy to mount the lens in a predetermined direction of the lens holder. Further, it is preferable to provide the mark of the lens on the round edge of the lens. The round edge of the lens has an outer peripheral side portion and a flat portion, on either of which the mark of the lens can be provided.

There is no particular limitation on a material for making the lens, such as glass, plastics or the like, as long as the lens made of such a material can be used in the optical pickup lens. Preferably, the lens is made of a plastic since its production is easy. A plastic lens is usually made by meltmolding, and is preferably used, since the mark can be easily provided on the lens without any special mold, by appropriately selecting a shape of a cut portion to be formed on the lens, when the molded lens is cut at a gate of the mold. It is preferable to form the mark of the lens integrally with the lens while the lens is being shaped by molding.

The mark of the lens is preferably a convex portion (which contains a projection etc.) which is a part or a whole of the gate portion of the lens which is left to remain after cutting the gate portion of the lens formed by the gate of the mold for use in injecting a molten plastic into the mold to form the lens. Otherwise, the mark of the lens is preferably a concave portion (which contains a dent and a groove etc.) formed on the lens after the gate portion of the lens is cut.

The lens holder of the present invention may be a commonly used lens holder, except that the mark is provided on the lens holder, as mentioned above. Preferably, the mark is provided at such a position of the lens holder that can oppose the mark of the lens while the lens is being rotated within the lens holder. By doing so, the position of the lens in the direction of rotation of the lens, relative to the optical axis of the lens can be more correctly and more easily understood. In case where the lens has a round edge, it is preferable that the lens holder has a portion for receiving the flat portion of the round edge of the lens and a portion for receiving the outer peripheral side portion thereof, and both the portions of the lens holder are shaped so as to correspond to the shape of the round edge of the lens.

Preferably, the marks of the lens and the lens holder have such shapes as to correspond each other. Examples of the combination of the marks of the lens and the lens holder (the mark of the lens-the mark of the lens holder) are (line(s)—line(s)), (line(s)—convex portion(s)), (line-concave portion(s)), (line(s)—groove(s)), (line(s)—dent(s)), (convex portion(s)—line(s)), (convex portion(s)—concave portion(s)), (convex portion(s)—groove(s)), (convex portion(s)—dent(s)), (convex portion(s)—fitting portion(s) to fit with the convex portion(s)), (projection(s)—line(s)), (projection(s)—concave portion(s)), (projection(s)—groove(s)), (projection(s)—dent(s)), (projection(s)—fitting portion(s) to fit with the projection(s)), (groove(s)—line(s)), (groove(s)—concave portion(s)), (groove(s)—groove(s)), (groove(s)—dent(s)), (dent(s)—line(s)), (dent(s)—concave portion(s)), (dent(s)—groove(s)), (dent(s)—dent(s)), etc., among which the combinations of (line(s)—line(s)), (groove(s)—line(s)), (convex portion(s)—fitting portion(s) to fit with the convex portion(s)) and (projection(s)—fitting portion(s) to fit with the projection(s)) are preferable.

When the convex portion is provided as the mark of the lens, it is more preferable to provide the fitting portion which fits with the convex portion of the lens, as the mark of the lens holder, because it becomes easy to position the lens in the predetermined direction of the lens holder. Preferably, the convex portion is provided on the round edge of the lens. In this regard, there is no limitation on the shape etc. of the fitting portion as long as the "fitting portion" as the mark of the lens holder is a portion which fits with the mark of the lens and by which the optical pickup lens of the present invention can be obtained. Examples of the fitting portion of the lens holder are a groove-like portion, a rib-like portion, etc. When the convex portion is provided as the mark of the lens holder, an appropriate fitting portion which can fit with such the convex portion may be provided as the mark of the lens.

Because the lens can be easily positioned in the predetermined direction of the lens holder, preferably a plurality of fitting portions any of which can fit with the convex portion of the lens as the mark of the lens are provided on the lens holder, by providing a plurality of ribs each of which can oppose the convex portion of the lens and protrudes in a direction parallel to the optical axis of the lens. There is no limitation on a method of forming the objective ribs which protrude in the direction parallel to the optical axis of the lens, as long as the intended ribs can be obtained.

Preferably, a plurality of fitting portions on the lens holder, each of which can fit with the convex portion of the lens, are provided by forming a plurality of grooves each of which can oppose the convex portion of the lens and is in parallel to the optical axis of the lens, on the portion of the lens holder which receives the outer peripheral side portion of the round edge of the lens. There is no limitation on selection of a method of forming the above grooves on the portion of the lens holder which receives the outer peripheral side portion of the round edge of the lens as long as the intended grooves can be obtained.

It is preferable to provide the fitting portions on the lens holder, each of which can fit with the convex portion of the lens, at regular intervals in the direction of rotation of the lens based on the optical axis of the lens as the center of rotation (i.e., at regular angular intervals based on the axis of rotation as the center of rotation), since the lens can be correctly mounted on the lens holder in accordance with a predetermined scale in the direction of rotation of the lens.

It is preferable that the fitting portions of the lens holder, each of which can fit with the convex portion of the lens, are provided at regular angular intervals of not more than 45°, because the lens can be positioned in accordance with the scale of not more than 45° in the direction of rotation of the lens. Therefore, it is preferable to provide the fitting portions on at least eight positions of the lens holder which are adjacent to the periphery of the lens in the direction of rotation of the lens. Further, the fitting portions may be provided on eight positions of the lens holder.

The present invention provides an optical pickup unit comprising any of the foregoing optical pickup lenses according to the present invention. Further, the present invention provides an optical disc apparatus for such as CD, MD, DVD or the like, which comprises the optical pickup unit according to the present invention.

Hereinafter, the optical pickup lenses according to the present invention will be described in more detail with reference to the accompanying drawings.

Embodiment 1

Figure 2:
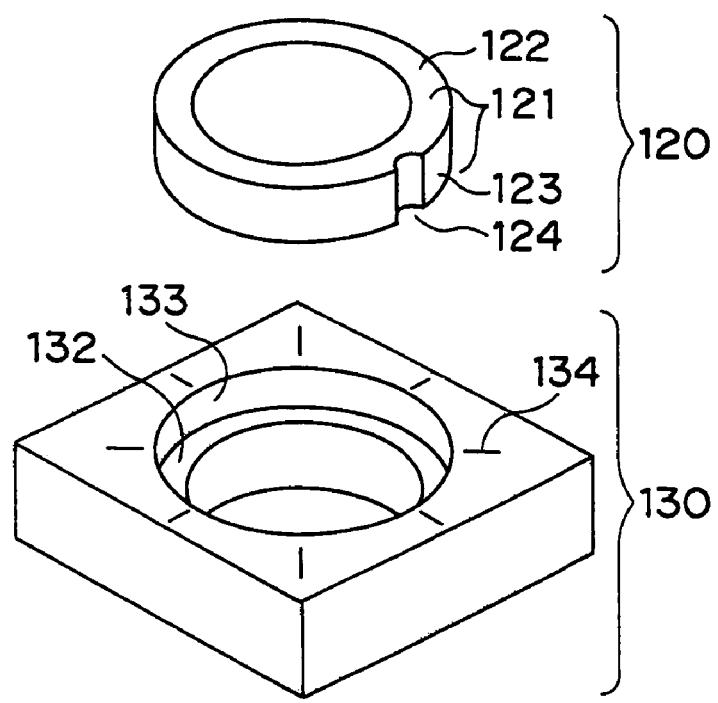
FIG. 2 is an exploded perspective view of the optical pickup lens according to Embodiment 1 of the present invention.

FIG. 1 is a front view of an optical pickup lens according to Embodiment 1 of the present invention, and FIG. 2 is an exploded perspective view of the same optical pickup lens. The optical pickup lens (110) comprises a lens (120) and a lens holder (130). The lens (120) has a round edge (121) which has a flat portion (122) and an outer peripheral side portion (123). One groove (or one concave portion) (124) as a mark is formed on the outer peripheral side portion (123) of the round edge of the lens. The lens holder (130) has a portion (132) for receiving the flat portion of the round edge (121) of the lens and a portion (133) for receiving the outer peripheral side portion thereof, so as to hold the round edge (121) of the lens. Eight lines (134) as marks are provided at regular intervals on the top face of the lens holder. The groove (124) as the mark of the lens is located so as to be able to oppose any of the lines (134) as the marks of the lens holder. Therefore, the lens can be correctly and easily positioned in a direction of rotation of the lens, relative to the lens holder.

In order to fully reduce astigmatism, it is preferred that an angular scale for mounting the lens is set at a small angle of not more than 45°. Therefore, in Embodiment 1, the eight marks are provided at regular intervals on the lens holder so as to equally divide a periphery of the lens into eight portions. In this regard, more marks may be provided at regular intervals on the lens holder so as to lessen the angular scale at which the lens is positioned and mounted on the lens holder.

One of the eight lines (134) provided as the marks of the lens holder may be discriminated from the other seven lines by forming it with a longer length, forming it as double lines, or forming it as a bold line.

Embodiment 2

Figure 3:
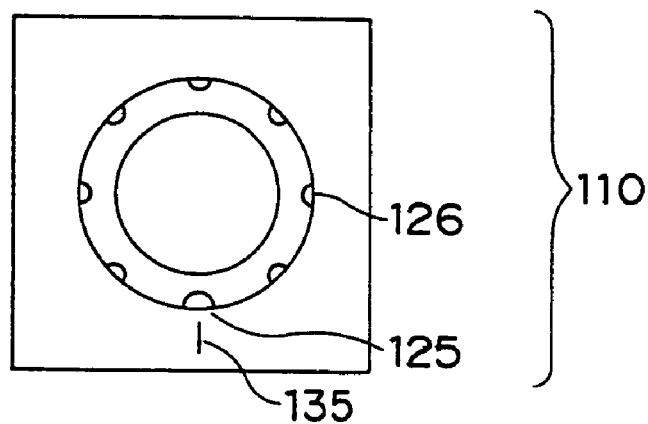
FIG. 3 is a front view of an optical pickup lens according to Embodiment 2 of the present invention.

FIG. 3 is a front view of an optical pickup lens according to Embodiment 2 of the present invention, which is substantially the same optical pickup lens as the optical pickup lens of Embodiment 1, except that eight grooves (125, 126) as marks are provided at regular intervals on the outer peripheral side portion (123) of the round edge of the lens, and that one line (135) is provided as a mark on the top face of the lens holder. One groove (125) of the grooves as the marks provided on the lens is larger in size than the other seven grooves (126), and therefore can be discriminated therefrom. Accordingly, this mark of the lens is useful to know which direction is displayed by the marks.

Embodiment 3

Figure 4:
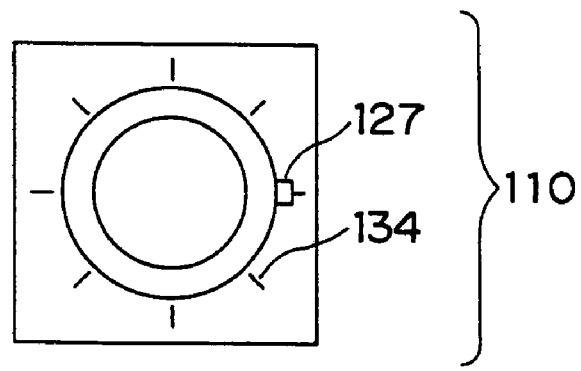
FIG. 4 is a front view of an optical pickup lens according to Embodiment 3 of the present invention.
Figure 5:
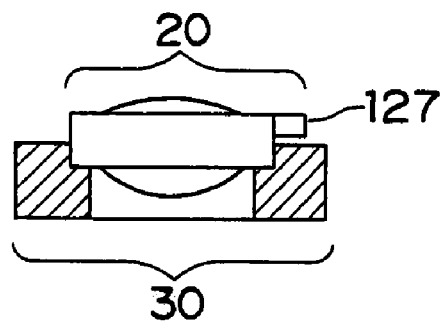
FIG. 5 is a sectional view of the optical pickup lens according to Embodiment 3 of the present invention.
Figure 6:
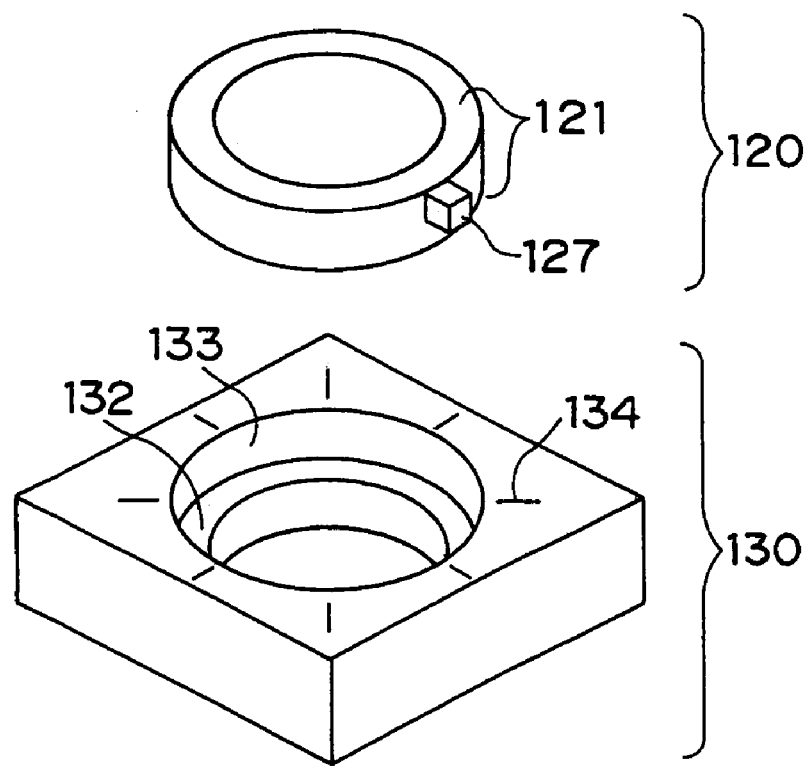
FIG. 6 is an exploded perspective view of the optical pickup lens according to Embodiment 3 of the present invention.

FIG. 4 is a front view of an optical pickup lens according to Embodiment 3 of the present invention; FIG. 5 is a sectional view of the same; and FIG. 6 is an exploded perspective view of the same. The optical pickup lens of Embodiment 3 is substantially the same as the optical pickup lens of Embodiment 1, except that one convex portion (127) is provided as a mark on the outer peripheral side portion (123) of the round edge of the lens, instead of one groove (124) as the mark on the outer peripheral side portion (123) of the round edge of the lens. The convex portion (127) on the outer peripheral side portion (123) of the round edge of the lens is located at such a position that does not come into contact with the top face of the lens holder (130), and thus does not hinder from positioning the lens on the lens holder.

Embodiment 4

Figure 7:
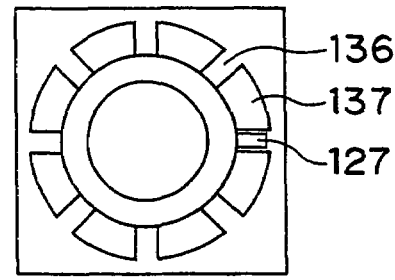
FIG. 7 is a front view of an optical pickup lens according to Embodiment 4 of the present invention.
Figure 8:
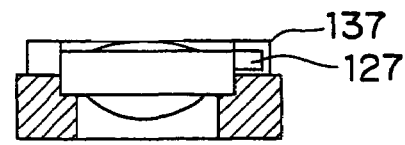
FIG. 8 is a sectional view of the optical pickup lens according to Embodiment 4 of the present invention.
Figure 9:
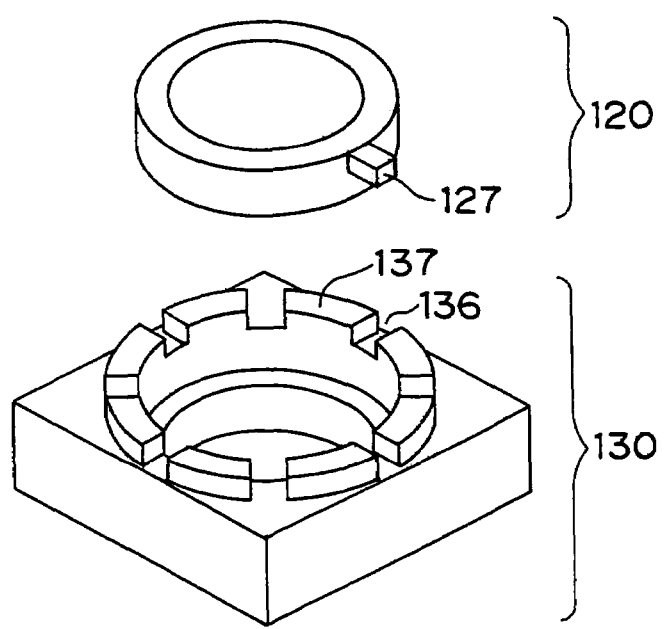
FIG. 9 is an exploded perspective view of the optical pickup lens according to Embodiment 4 of the present invention.

FIG. 7 is a front view of an optical pickup lens according to Embodiment 4 of the present invention; FIG. 8 is a sectional view of the same; and FIG. 9 is an exploded perspective view of the same. The optical pickup lens of Embodiment 4 is substantially the same as the optical pickup lens of Embodiment 3, except that fitting portions (136), any of which fits with the convex portion (127) of the lens, are groove-like provided as marks of the lens holder at regular intervals, by providing ribs (137) on the top face of the lens holder (130) and at such positions that can oppose the outer peripheral side portion (123) of the round edge of the lens.

The ribs (137) may be provided on the lens holder by any method. There is no limitation on the method of providing the ribs (137) on the lens holder, as long as the intended optical pickup lens of the present invention can be obtained. The fitting portions, any of which can fit with the convex portion of the lens, are provided at regular intervals and at such positions that can oppose the convex portion of the lens. Furthermore, the convex portion of the lens is fitted in any of the fitting portions of the lens holder, so that the lens is positioned in a direction of rotation of the lens. In order to fully reduce astigmatism, it is preferred that the angular scale for mounting the lens is set at not more than 45°. Therefore, eight fitting portions are provided at regular intervals. Consequently, the lens can be easily positioned at the predetermined angle by rotating the lens in accordance with the angular scale of 45°.

Embodiment 5

Figure 10:
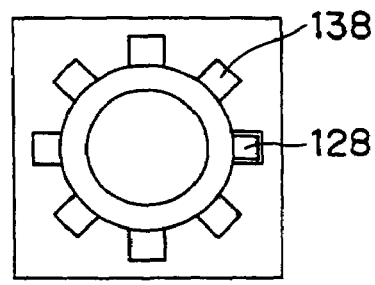
FIG. 10 is a front view of an optical pickup lens according to Embodiment 5 of the present invention.
Figure 11:
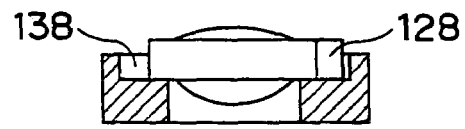
FIG. 11 is a sectional view of the optical pickup lens according to Embodiment 5 of the present invention.
Figure 12:
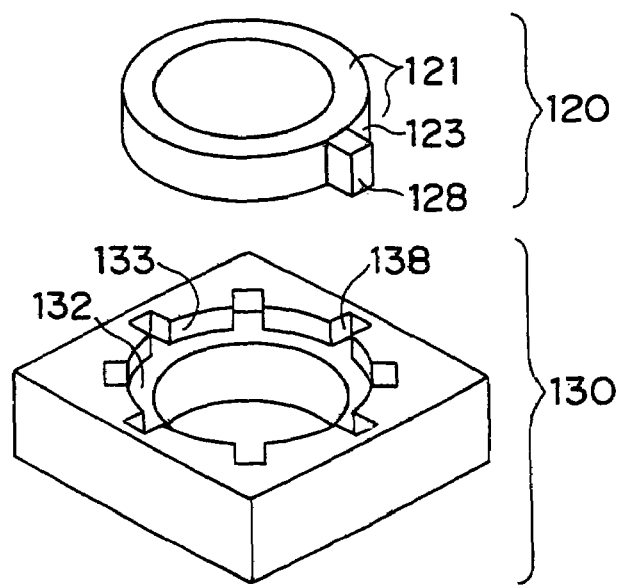
FIG. 12 is an exploded perspective view of the optical pickup lens according to Embodiment 5 of the present invention.
Figure 13:
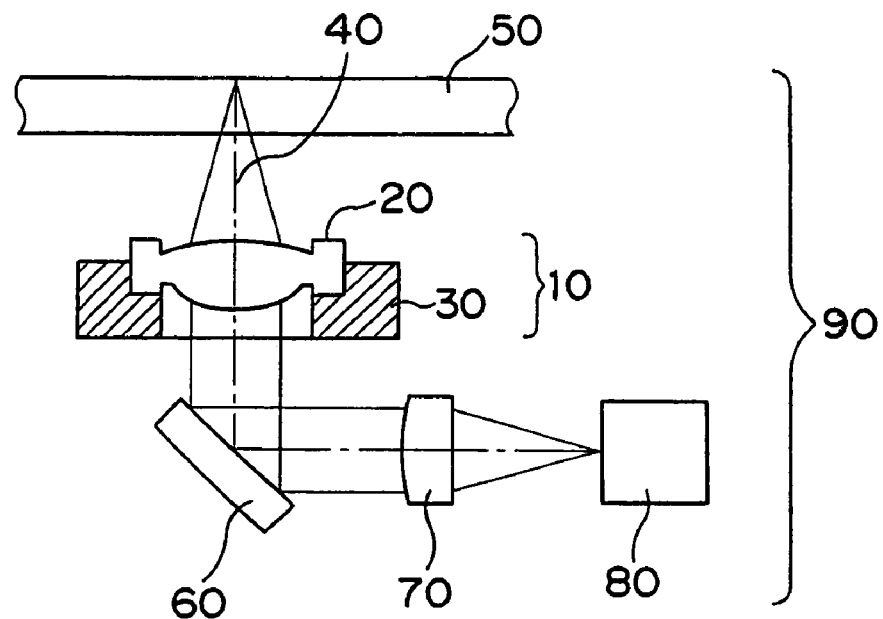
FIG. 13 is a schematic diagram of a conventional optical pickup unit, illustrating a structure thereof.
Figure 14:
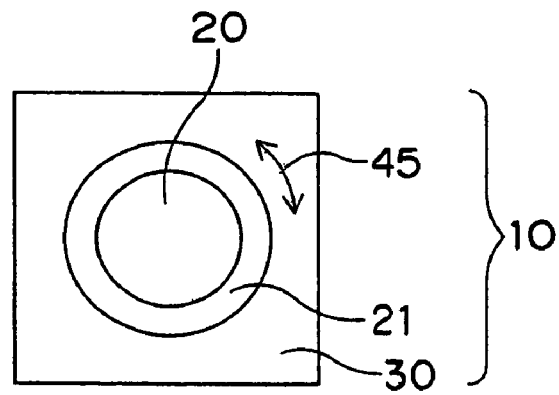
FIG. 14 is a plan view of a conventional optical pickup lens, illustrating a conventional method of mounting a lens on a lens holder and positioning the lens relative to the lens holder.
Figure 15:
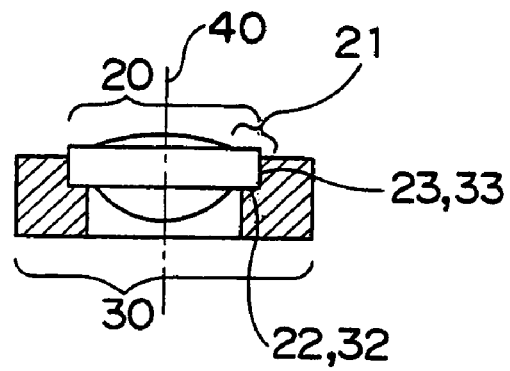
FIG. 15 is a sectional view of the conventional optical pickup lens, illustrating the conventional method of mounting the lens on the lens holder and positioning the lens relative to the lens holder.
Figure 16:
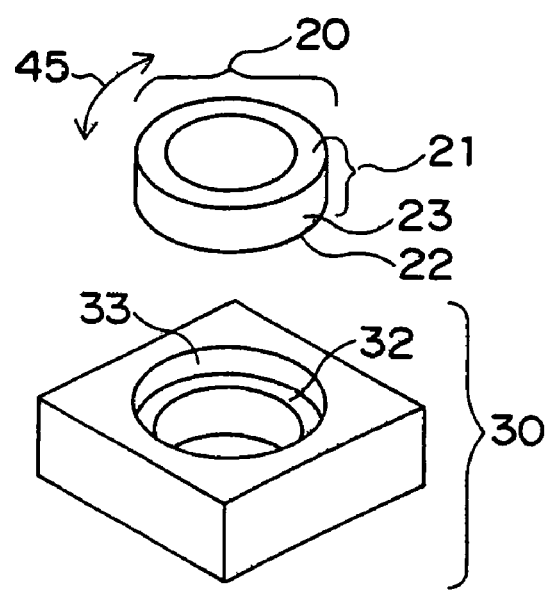
FIG. 16 is an exploded perspective view of the conventional optical pickup lens, illustrating the conventional method of mounting the lens on the lens holder and positioning the lens relative to the lens holder.

FIG. 10 is a front view of an optical pickup lens according to Embodiment 5 of the present invention; FIG. 11 is a sectional view of the same; and FIG. 12 is an exploded perspective view of the same. In the optical pickup lens of Embodiment 5, a convex portion (128) provided as a mark of the lens (120) on the outer peripheral side portion (123) of the round edge of the lens has the same thickness as that of the round edge (121) of the lens, and fitting portions (138), any of which fits with the convex portion (128), are groove-like provided as marks of the lens holder (130), on the portion (133) of the lens holder (130) which receives the outer peripheral side portion of the round edge of the lens. This arrangement is preferably employed, for example, when the thickness of the round edge (121) of the lens is thin. Depth of the fitting portions (138) of the lens holder is needed to reach the portion (132) of the lens holder which receives the flat portion of the round edge of the lens, and therefore, the fitting portions (138) are groove-like formed. Further, in Embodiment 5, the eight fitting portions (138) are provided at regular intervals on the lens holder, in order to fully reduce astigmatism.

The groove-like fitting portions (138) may be provided by any method. There is no limitation on the method of providing the groove-like fitting portions (138) on the lens holder, as long as the intended optical pickup lens of the present invention can be obtained.

One of the marks provided on each of the lenses according to any one of Embodiments 1 to 5 can be provided by using a shape of a cut gate portion of the lens which remains on cutting the gate portion of the lens, in case of a plastic lens. When the mark of the lens is a concave portion, such a concave portion can be obtained by cutting the gate portion of the lens up to a part of the round edge of the lens. When the mark is a convex portion, the convex portion can be provided by cutting the gate portion of the lens so as to leave a part or a whole of such a gate portion to remain.

What is claimed is:

1. An optical pickup lens comprising a lens and a lens holder, wherein each of the lens and the lens holder has at least one mark in a direction of rotation based on an optical axis of the lens as a center of rotation, wherein at least eight marks are provided on positions of the periphery of the lens or on positions of the lens holder which are adjacent to the periphery of the lens.

2. An optical pickup lens according to claim 1, wherein the mark of the lens holder is provided so as to oppose the mark of the lens.

3. An optical pickup lens according to claim 1, wherein the marks of the lens and the lens holder are provided at regular intervals, respectively.

4. An optical pickup lens according to claim 1, wherein one mark is provided on a position of a periphery of the lens, and at least eight marks are provided on positions of the lens holder which are adjacent to the periphery of the lens.

5. An optical pickup lens according to claim 1, wherein one mark is provided on a position of the lens holder which is adjacent to a periphery of the lens, and at least eight marks are provided on positions of the periphery of the lens.

6. An optical pickup lens according to claim 1, wherein at least one of the marks of the lens is discriminated from the other marks of the lens.

7. An optical pickup lens according to claim 1, wherein the lens has a round edge, and the mark of the lens is provided on the round edge.

8. An optical pickup lens according to claim 1, wherein the mark of the lens is a line, a convex portion, or a concave portion.

9. An optical pickup lens according to claim 8, wherein the convex portion is provided as the mark of the lens, and a fitting portion which fits with the convex portion of the lens is provided on the lens holder.

10. An optical pickup lens according to claim 9, wherein a plurality of fitting portions each of which fits with the convex portion of the lens are provided on the lens holder by providing a plurality of ribs each of which opposes the convex portion of the lens and protrudes in a direction parallel to the optical axis of the lens.

11. An optical pickup lens according to claim 9, wherein a plurality of fitting portions each of which fits with the convex portion of the lens are provided on the lens holder by forming a plurality of grooves each of which opposes the convex portion of the lens and extends in a direction parallel to the optical axis of the lens on a portion of the lens holder which receives an outer peripheral side portion of a round edge of the lens.

12. An optical pickup lens according to claim 9, wherein a plurality of fitting portions each of which fits with the convex portion of the lens are provided on the lens holder at regular intervals in a direction of rotation based on the optical axis of the lens as the center of rotation.

13. An optical pickup lens according to claim 9, wherein angular intervals of the fitting portions of the lens holder each of which fits with the convex portion of the lens are 45°.

14. An optical pickup lens according to claim 1, wherein the lens is a plastic lens, and the lens and the mark of the lens are integrally formed.

15. An optical pickup lens according to claim 14, wherein
the mark of the lens is a convex portion which is composed of a part or a whole of a gate portion of the lens which is left to remain after cutting the gate portion of the lens formed by a gate of a mold through which a molten plastic is injected into the mold so as to form the lens; or
the mark of the lens is a concave portion formed on the lens after cutting said gate portion of the lens.

16. An optical pickup unit comprising the optical pickup lens according to claim 1.

17. An optical disc apparatus comprising the optical pickup unit according to claim 16.

18. An optical pickup lens comprising a lens and a lens holder, wherein each of the lens and the lens holder has a least one mark in a direction of rotation based on an optical axis of the lens as a center of rotation, wherein at least one of the marks of the lens is discriminated from the other marks of the lens.

19. An optical pickup unit comprising the optical pickup lens according to claim 18.

20. An optical disc apparatus comprising the optical pickup unit according to claim 19.

21. An optical pickup lens comprising a lens and a lens holder, wherein each of the lens and the lens holder has at least one mark in a direction of rotation based on an optical axis of the lens as a center of rotation, wherein a plurality of marks of lens and/or lens holder are provided and an angular interval of the marks provided on the lens and/or the lens holder is not more than 45° based on the optical axis of the lens.

22. An optical pickup lens according to claim 21, wherein the mark of the lens holder is provided so as to oppose the mark of the lens.

23. An optical pickup lens according to claim 21, wherein at least one of the marks of the lens is discriminated from the other marks of the lens.

24. An optical pickup lens according to claim 21, wherein the lens has a round edge, and the mark of the lens is provided on the round edge.

25. An optical pickup lens according to claim 21, wherein the mark of the lens is a line, a convex portion or a concave portion.

26. An optical pickup lens according to claim 25, wherein the convex portion is provided as the mark of the lens, and a fitting portion which fits with the convex portion of the lens is provided on the lens holder.

27. An optical pickup lens according to claim 26, wherein a plurality of fitting portions each of which fits with the convex portion of the lens are provided on the lens holder by providing a plurality of ribs each of which opposes the convex portion of the lens and protrudes in a direction parallel to the optical axis of the lens.

28. An optical pickup lens according to claim 26, wherein a plurality of fitting portions each of which fits with the convex portion of the lens arc provided on the lens holder by forming a plurality of grooves each of which opposes the convex portion of the lens and extends in a direction parallel to the optical axis of the lens on a portion of the lens holder which receives an outer peripheral side portion of a round edge of the lens.

29. An optical pickup lens according to claim 26, wherein angular intervals of the fitting portions of the lens holder each of which fits with the convex portion of the lens are 45°.

30. An optical pickup lens according to claim 21, wherein the lens is a plastic lens, and the lens and the mark of the lens are integrally formed.

31. An optical pickup lens according to claim 30, wherein the mark of the lens is a convex portion which is composed of a part or a whole of a gate portion of the lens which is left to remain after cutting the gate portion of the lens formed by a gate of a mold through which a molten plastic is injected into the mold so as to form the lens; or the mark of the lens is a concave portion formed on the lens after cutting said gate portion of the lens.

32. An optical pickup unit comprising the optical pickup lens according to claim 21.

33. An optical disc apparatus comprising the optical pickup unit according to claim 32.

* * * * *

UNITED STATES PATENT AND TRADEMARK OFFICE
CERTIFICATE OF CORRECTION

| | | |
|---|---|---|
| PATENT NO. | : 7,099,090 B2 | Page 1 of 1 |
| APPLICATION NO. | : 10/782920 | |
| DATED | : August 29, 2006 | |
| INVENTOR(S) | : Akihiro Daikoku | |

It is certified that error appears in the above-identified patent and that said Letters Patent is hereby corrected as shown below:

In the Claims:

In Claim 21, column 12 line 4, change "each at the" to --each of the--

Signed and Sealed this

Fifth Day of December, 2006

JON W. DUDAS
*Director of the United States Patent and Trademark Office*